Aug. 10, 1948.  D. F. WARNER  2,446,861
CENTRIFUGAL SPEED GOVERNOR
Filed Sept. 11, 1944
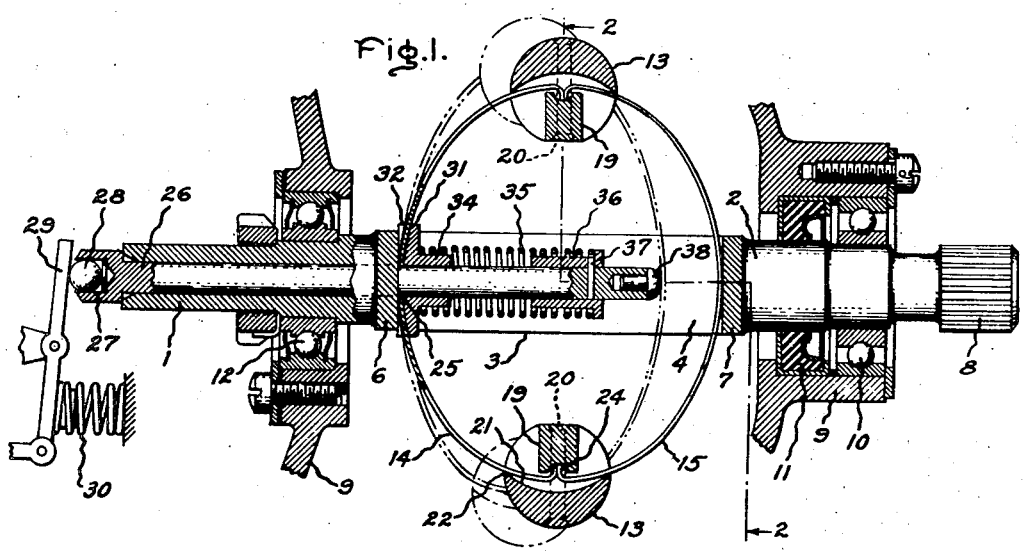
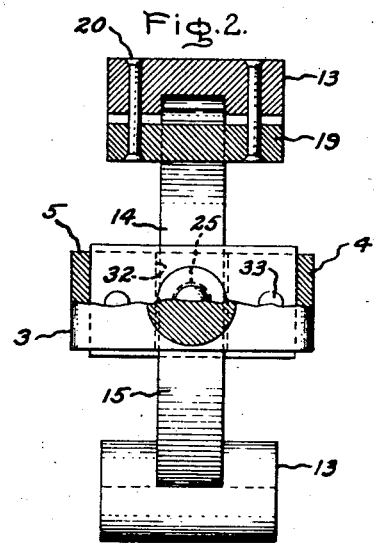
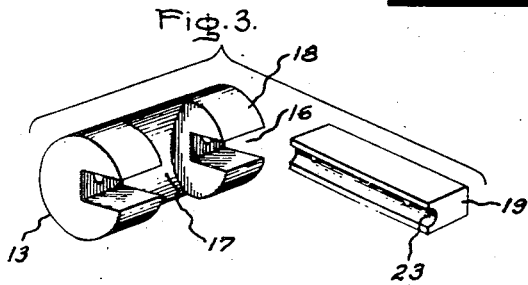
Inventor:
Donald F. Warner,
by *Harry E. Dunham*
His Attorney.

Patented Aug. 10, 1948

2,446,861

UNITED STATES PATENT OFFICE 2,446,861

CENTRIFUGAL SPEED GOVERNOR

Donald F. Warner, Swampscott, Mass., assignor to General Electric Company, a corporation of New York Application September 11, 1944, Serial No. 553,611

8 Claims. (Cl. 264—18)

The present invention relates to centrifugal speed governors having flyweights supported on and biased against centrifugal action by leaf spring means.

The object of my invention is to provide an improved construction and arrangement of centrifugal governors of the type aforementioned which is simple in construction and light in weight.

For a consideration of what I believe to be novel and my invention, attention is directed to the following description and claims appended thereto in connection with the accompanying drawing.

In the drawing Fig. 1 illustrates a sectional view of a centrifugal speed governor embodying my invention; Fig. 2 is a section along line 2—2 of Fig. 1; and Fig. 3 is an exploded perspective view of a flyweight and spring supporting means.

The governor comprises a spindle having end portions forming shafts stubs 1 and 2 and an intermediate portion forming a frame 3 with side walls 4, 5 and end walls 6, 7 integral with the shaft stubs 1 and 2 respectively. The shaft stub 2 has a right-hand end portion forming a spline 8 which may be driven from a turbine or like machine (not shown) to be regulated. The stub 2 is supported on a casing 9 by a ball-bearing 10 and sealed to said casing by a packing 11. The shaft stub 1 is supported on the casing 9 by means of another ball-bearing 12.

The governor includes two flyweights 13 supported on and biased by two separate curved leaf springs 14 and 15. Each flyweight is machined from a cylindrical bar having an axial groove 16 and a central recess or cut-away portion 17 perpendicular to the groove 16, thus forming a pair of prongs 18 at each end for receiving the end portions of a bar 19 secured in the groove 16 by means of rivets 20. The central recess 17 has a curved bottom 21 forming with the outer wall sharp edges 22. The bar 19 has a grooved side 23 facing the curved bottom 21. Each spring 14, 15 has inwardly bent end portions 24 pivotally engaging the groove 23 of the bar 19 which broadly constitutes a knife-edge bearing surface for the ends of the springs.

When assembled the two springs together are essentially elliptical, each forming one half of an ellipse, with the long or major axis of the ellipse perpendicular to the axis of the spindle and the minor axis of the ellipse coinciding with the axis of the spindle. Prior to assembly the two springs are essentially circular or elliptical but with the short axis of the ellipse formed between the ends of the spring. Thus, when assembled the springs are in a biased state with the central portions of the two springs engaging the end walls 6, 7 of the frame 3. In this position the inwardly turned ends of the springs are located in the grooves 23, and intermediate portions of each spring near the inwardly bent ends engage the sharp edges or corners 22 of the respective flyweights. During operation, that is, upon rotation of the spindle 1, 2, 3, the flyweights are gradually forced radially outward and as this happens the intermediate portions of each spring move away from the sharp corners 22 so that each spring engages with its inwardly bent ends only the respective flyweights. From another angle, during operation each flyweight is pivotally held only on the substantially frictionless knife-edge bearings formed by the adjacent inwardly bent end portions of the springs.

The spring 14 has a central opening 25. The shaft stub 1 has a bore extending through the end wall 6 of the frame. An inner spindle or actuating or control rod 26 projects slidingly through said bore and through the opening 25 of the spring 14. The left-hand end of the rod 26 has a head with an opening 27 accommodating a ball 28 arranged to engage a fulcrumed control lever 29 biased towards the ball by a compression spring 30. The spring 14 is held on the end wall 6 of the frame by means of a plate 31 which has a central curved cut-out or recess 32 for accommodating a portion of the spring. The plate 31 is secured to the end wall 6 by means of rivets 33 causing transmission of torque from the spindle to the springs and flyweights and limiting relative rotational movement between them. The plate 31 has a sleeve extension 34 for accommodating one end of a compression spring 35, the other end of which engages a flanged sleeve 36 surrounding the rod 26 and secured thereto by a pin 37. The right-hand end of the rod 26 has a rounded head 38 formed by a screw secured to the rod 26 and arranged to engage a central portion of the spring 15 during operation. The compression spring 35 forces the rod 26 towards the right, causing engagement between the head at the left-hand end of the rod and the end of the shaft stub 1. With increasing speed the centrifugal force of the flyweight overcomes the biasing action of the springs 14, 15, causing gradual flattening thereof and at a certain speed the spring 15 engages the head 38. With a further increase in speed the rod 26 is forced towards the left against the biasing force of the spring 35 to effect counterclockwise movement of the control lever 29.

Thus, with my invention I have accomplished an improved construction and arrangement of centrifugal governors having flyweights pivotally held on two separate curved biasing leaf springs held in a rotatable frame with a central portion of one of the springs attached to the wall of the frame and a central portion of the other spring arranged at a certain speed to engage an actuating rod. The provision of separate springs is important because it results in a governor with wide operating range.

What I claim as new and desire to secure by Letters Patent of the United States is:

1. Centrifugal flyball type governor comprising a spindle having an intermediate portion forming a frame and end portions forming shaft stubs, means rotatably supporting the stubs, a pair of separate curved leaf springs together defining an ellipse and each having inwardly bent free end portions and an intermediate portion, one of said intermediate portions being secured to the frame, and a pair of flyweights pivotally engaging said spring end portions.

2. Centrifugal flyball type governor comprising a spindle having a portion forming a frame and end portions forming stub shafts, bearing means rotatably supporting the spindle, a pair of separate curved leaf springs together defining an ellipse and having inwardly bent free end portions, one of said springs having a central portion with an opening therethrough and secured to the frame, a pair of flyweights pivotally engaging said end portions, one of the shaft stubs having an axial bore, an actuating rod extending through the bore and having a radially extending shoulder adjacent the end of the respective stub, said rod projecting through said opening and having an end adjacent and adapted to be engaged by the central portion of the other leaf spring, and means biasing said rod into said bore in a direction to cause said shoulder to engage the adjacent end of the stub shaft.

3. Centrifugal flyball type governor comprising a spindle having an intermediate portion forming a frame and end portions forming stub shafts, a pair of flyweights each having a knife-edge type bearing surface, a pair of separate curved leaf springs together defining an ellipse and each having a central portion arranged within the frame and having inwardly bent end portions freely engaging the respective knife-edge bearing surfaces of the flyweights, means securing the central portion of one of the springs to the frame in torque-transmitting relation therewith, and a control member cooperatively associated with the central portion of the other spring to be moved thereby upon certain changes in speed.

4. In a centrifugal flyball type governor, the combination of a rotatable spindle, a pair of separate curved leaf springs together defining substantially an ellipse with one axis coaxial with the spindle, each spring having end portions located substantially at the ends of the other axis of the ellipse, each of said springs also having an intermediate portion adjacent the ends of the first mentioned axis of the ellipse, one of said intermediate portions being arranged to support the springs on the spindle in torque-transmitting relation therewith, the other of said intermediate portions being adapted to engage a movable control member for the actuation thereof in accordance with rotational speed changes, and a pair of flyweights having knife-edge type bearing surfaces arranged to engage said end portions of the springs.

5. A spring and flyweight assembly for a centrifugal flyball type governor comprising a pair of separate curved leaf springs together defining substantially an ellipse and adapted to be supported with one axis coincident with the axis of rotation, the springs having adjacent end portions located substantially at the ends of the other axis of the ellipse with inwardly extending extreme end portions each forming a knife-edge, and a pair of flyweights supported on the adjacent end portions of the leaf springs, each flyweight defining a central recess into which the adjacent end portions of the leaf springs extend and an outwardly facing bearing surface engaged by said in-turned knife-edge ends of the springs, whereby each spring acts as a separate free leaf spring substantially without modification by friction forces.

6. A spring and flyweight assembly for a centrifugal flyball type governor comprising a pair of separate curved leaf springs together defining substantially an ellipse and adapted to be supported with one axis coincident with the axis of rotation, the springs having adjacent end portions located substantially at the ends of the other axis of the ellipse, and a pair of flyweights supported on said adjacent end portions of the springs, each flyweight defining a central recess into which the adjacent end portions of the leaf springs extend and an outwardly facing bearing surface, the adjacent leaf spring end portions each having knife-edge means facing inwardly and engaging said respective bearing surfaces substantially without friction.

7. A spring and flyweight assembly for a centrifugal flyball type governor comprising a pair of separate curved leaf springs together defining substantially an ellipse and adapted to be supported with one axis coincident with the axis of rotation, each spring having end portions with extreme end portions extending radially inwardly and located substantially at the ends of the other axis of the ellipse, and a pair of flyweights supported by the respective pairs of spring end portions, each of said flyweights comprising a substantially cylindrical member arranged with its axis in a plane normal to the axis of rotation and tangent to the path of rotation of the flyweight, the flyweight having axially spaced end portions defining a central recess facing radially inwardly and adapted to receive the adjacent ends of the leaf springs, each of the flyweight end portions having a recess which extends axially of the flyweight, and a bearing bar arranged axially of the flyweight with end portions disposed in said end recesses and having a mid-portion defining an outwardly facing bearing surface adapted to engage the inturned ends of the leaf springs, and means securing the bearing bar in the end recesses of the flyweight with the adjacent end portions of the leaf spring projecting into the central recess and the in-turned end portions engaging the bearing surface of the bar substantially without friction.

8. A spring and flyweight assembly for a centrifugal flyball type governor comprising a pair of separate curved leaf springs together defining substantially an ellipse and adapted to be supported with one axis coincident with the axis of rotation, each spring having end portions with extreme end portions extending radially inwardly and located substantially at the ends of the other axis of the ellipse, and a pair of flyweights supported by the respective pairs of spring end portions, each of the flyweights comprising a substantially cylindrical member arranged with its axis in a plane normal to the axis of rotation and tangent to the path of rotation of the flyweight, said member having axially spaced end portions defining therebetween a central recess opening radially inwardly and adapted to receive adjacent ends of the leaf springs, and a bearing bar arranged axially of the flyweight and having a mid-portion spaced therefrom and end portions adapted to be secured to the flyweight, said mid-portion of the bearing bar defining an outwardly facing bearing surface, and means securing the bearing bar to the flyweight with the adjacent end portions of the leaf springs projecting into the central recess defined between the flyweight and bar and with the in-turned end portions of the leaf springs engaging said bearing surface substantially without friction, the mid-portion of the flyweight defining at either side of said bearing surface an inwardly facing corner adapted to engage the outer surfaces of the leaf spring end portions.

DONALD F. WARNER.

REFERENCES CITED

The following references are of record in the file of this patent:

UNITED STATES PATENTS

| Number | Name | Date |
| --- | --- | --- |
| 85,580 | Gilbert | Jan. 5, 1869 |
| 687,650 | Place | Nov. 26, 1901 |